United States Patent
Ekkelenkamp et al.

(10) Patent No.: US 9,676,633 B2
(45) Date of Patent: Jun. 13, 2017

(54) PROCESS FOR PREPARING CRYSTALLINE AMMONIUM SULFATE PRODUCT

(71) Applicant: CAP III B.V., Sittard (NL)

(72) Inventors: Geert Ekkelenkamp, Echt (NL); Johan Thomas Tinge, Echt (NL); Pieter Vonk, Echt (NL)

(73) Assignee: CAP III B.V., Sittard (NL)

( * ) Notice: Subject to any disclaimer, the term of this patent is extended or adjusted under 35 U.S.C. 154(b) by 0 days.

(21) Appl. No.: 14/425,419

(22) PCT Filed: Sep. 12, 2013

(86) PCT No.: PCT/EP2013/068920
§ 371 (c)(1),
(2) Date: Mar. 3, 2015

(87) PCT Pub. No.: WO2014/044593
PCT Pub. Date: Mar. 27, 2014

(65) Prior Publication Data
US 2015/0218008 A1    Aug. 6, 2015

(30) Foreign Application Priority Data

Sep. 24, 2012    (EP) .................................... 12185624

(51) Int. Cl.
| | | |
|---|---|---|
| C01C 1/24 | (2006.01) |
| C01C 1/248 | (2006.01) |
| B01D 9/00 | (2006.01) |
| C05C 3/00 | (2006.01) |

(52) U.S. Cl.
CPC ............ C01C 1/248 (2013.01); B01D 9/0031 (2013.01); B01D 9/0063 (2013.01); C01C 1/24 (2013.01); C05C 3/005 (2013.01); B01D 9/0036 (2013.01)

(58) Field of Classification Search
CPC ........ B01D 9/0022; C01B 11/185; C01C 1/24
USPC ...................................................... 23/302 A
See application file for complete search history.

(56) References Cited

U.S. PATENT DOCUMENTS

| 7,380,671 B2 | 6/2008 | Loomans-V.D. Anker |
| 2003/0180202 A1 | 9/2003 | Ellen et al. |
| 2011/0268644 A1 | 11/2011 | Huffman et al. |

FOREIGN PATENT DOCUMENTS

| CN | 1214979 C | 8/2005 |
| JP | 53-9585 | 4/1978 |
| JP | 59 162127 | 9/1984 |
| JP | 4-26512 | 1/1992 |
| JP | 2003-251217 | 9/2003 |
| JP | 2005-194153 | 7/2005 |
| TW | 201012754 | 4/2010 |
| WO | 93/19826 | 10/1993 |
| WO | WO 02/081374 | 10/2002 |
| WO | WO 2009/077346 | 6/2009 |
| WO | WO 2009/095361 | 8/2009 |

OTHER PUBLICATIONS

International Search Report for PCT/EP2013/068920, mailed Jan. 2, 2014, 2 pages.

*Primary Examiner* — Edward Johnson
(74) *Attorney, Agent, or Firm* — Nixon & Vanderhye P.C.

(57) ABSTRACT

The invention relates to a process for preparing a crystalline ammonium sulfate product, which process comprises: a) subjecting in a crystallizer a feed solution of ammonium sulfate to crystallization to form a first slurry of ammonium sulfate crystals; b) subjecting the first slurry of ammonium sulfate crystals to a first size classification to yield a first coarse ammonium sulfate crystal fraction and a first fine ammonium sulfate crystal fraction; c) recycling at least part of the first fine ammonium sulfate crystal fraction to the feed solution of ammonium sulfate; and d) recovering a crystalline ammonium sulfate product from the first coarse ammonium sulfate crystal fraction, characterized in that: e) a second size classification is carried out on a second slurry of ammonium sulfate crystals to yield a second coarse ammonium sulfate crystal fraction and a second fine ammonium sulfate crystal fraction.

10 Claims, 5 Drawing Sheets

PROCESS FOR PREPARING CRYSTALLINE AMMONIUM SULFATE PRODUCT

This application is the U.S. national phase of International Application No. PCT/EP2013/068920, filed 12 Sep. 2013, which designated the U.S. and claims priority to EP Patent Application No. 12185624.9, filed 24 Sep. 2012, the entire contents of each of which are hereby incorporated by reference.

The invention relates to a method for preparing ammonium sulfate crystals.

Ammonium sulfate is a useful fertilizer, e.g., for use in agriculture, horticulture or forestry. It is often applied as a crystalline material. Ammonium sulfate crystals for this use are classified according to crystal size. In general large crystals are more easy to handle. Further, crystals of a certain size distribution, of relatively large average crystal size, can be used in commercially valuable fertilizer blends and are therefore economically more valuable than small crystals.

Ammonium sulfate crystals may be obtained by subjecting an ammonium sulfate solution to crystallization and subjecting the resulting slurry of ammonium sulfate crystals to a size classification step, wherein the crystals are separated into a fraction enriched in larger crystals (coarse crystal fraction) and a fraction enriched in smaller crystals (fine crystal fraction). The large crystals are generally desired as the product for a further use, in particular for use as a fertilizer.

WO2009/077346 describes a process for producing ammonium sulfate crystals including size classification steps. Dried crystals are separated by a sieve; and, prior to that, fine crystals in solution are removed from the bulk suspension in a wash thickener.

JP-A-3150217, JP-A-426512 and WO 02/081374 each describe a process for classifying ammonium sulfate crystals by size using a screen. These processes comprise feeding a slurry of ammonium sulfate crystals in ammonium sulfate solution to the screen which prevents large crystals from permeating. Thereby, a coarse crystal fraction and a fine crystal fraction are formed. In WO 02/081374 both sides of the screen are immersed in liquid in order to prevent clogging. The coarse crystal fraction is typically subjected to drying to obtain a crystalline ammonium sulfate product. In a specific embodiment the fine crystal fraction is recycled to the crystallizer in order to further grow the crystals therein into large crystals.

However, a problem with the above process is that even the smallest crystals in the fine crystal fraction are recycled to the crystallizer. This will increase the total surface area of the crystals in the crystallizer, which leads to a reduction in the supersaturation. This leads to a slower growth of the crystals; and thus to a smaller average crystal size. Therefore, the average crystal size of the ammonium sulfate crystals exiting the crystallizer is unsatisfactorily low. Accordingly, the production rate of large crystals therefrom is relatively low.

One solution to this is to increase residence time of crystals in the crystallizer. However, an increase in residence time reduces throughput of the crystallization step, necessitating a larger, more complex crystallizer, or even a second crystallizer. Further, active control of the crystallization conditions is needed in order to be able to provide a constant product quality. Both of these solutions are complicated by the need for additional apparatus and control systems for a sensitive part of the process.

It is an object of the present invention to provide a continuous process for preparing ammonium sulfate crystals which overcomes the drawbacks of the above mentioned processes. Specifically, it is an object to provide a process which yields, in an economical way, a crystalline ammonium sulfate product having a higher average crystal size than known processes. Further, it is desired to increase the throughput of the process and reduce energy consumption. One or more further objectives that may be addressed will become apparent from the description below.

The present inventors have now found that the above objects are met by carrying out a second size classification step, and redissolving at least some of the finest crystals produced from the double classification system before recycling that fraction back to the crystallizer.

Accordingly, the invention provides a process for preparing a crystalline ammonium sulfate product, which process comprises:

a) subjecting in a crystallizer a feed solution of ammonium sulfate to crystallization to form a first slurry of ammonium sulfate crystals;

b) subjecting the first slurry of ammonium sulfate crystals to a first size classification to yield a first coarse ammonium sulfate crystal fraction and a first fine ammonium sulfate crystal fraction;

c) recycling at least part of the first fine ammonium sulfate crystal fraction to the feed solution of ammonium sulfate; and d) recovering a crystalline ammonium sulfate product from the first coarse ammonium sulfate crystal fraction, characterized in that:

e) a second size classification is carried out on a second slurry of ammonium sulfate crystals to yield a second coarse ammonium sulfate crystal fraction and a second fine ammonium sulfate crystal fraction.

The present invention also provides a crystalline ammonium sulfate product obtained by a process as described above.

Further, the present invention provides an ammonium sulfate crystallization plant comprising a crystallizer, a first size classifier, and a second size classifier having a threshold size smaller than that of the first size classifier.

By crystalline ammonium sulfate is meant the end-product of the claimed process. To avoid confusion this term does not include seed crystals or crystals in the crystallizer, or crystals removed from the crystallizer, but crystals recovered in the separating unit.

The feed solution of ammonium sulfate is fed to the crystallizer. The feed solution may originate from another chemical process. For example, it typically originates from a process for producing caprolactam or acrylonitrile. Accordingly, the feed solution of ammonium sulfate crystals typically contains impurities consistent with such a feed. Further, where a slurry of ammonium sulfate crystals is described as being fed to the ammonium sulfate feed solution, it is in fact a feed solution of ammonium sulfate which additionally contains ammonium sulfate crystals which is fed into the crystallizer.

Any suitable crystallizer may be used. It is particularly preferred to use a crystallizer of the DTB-type or Oslo-type. Since production of large crystals is preferred, a low-shear crystallizer is preferred.

The conditions under which crystallization occur are known to the person of skill in the art. Preferably, use is made of evaporative crystallization. In particular, the method may comprise a multiple effect evaporation process. Such process is generally known to the skilled person. It comprises the use of a plurality of crystallizers, which are operated in parallel with respect to the ammonium sulfate crystallization, and wherein vapor produced in a first crystallizer during the evaporative crystallization is used for heating a subsequent crystallizer.

As used herein the term subjecting to size classification means that the slurry of ammonium sulfate crystals is separated into two slurries: one having an average crystal size larger than the other. Herein, these are referred to as a coarse ammonium sulfate crystal fraction and a fine ammonium sulfate crystal fraction, respectively.

By recycling to the feed solution of ammonium sulfate is meant that the recycled solution is mixed with the feed solution. Mixing may occur before the feed solution enters a crystallizer or mixing may occur in a crystallizer.

Crystalline ammonium sulfate is recovered in a recovery unit by separation from ammonium sulfate solution in the first coarse ammonium sulfate fraction. Typically this is by sieving. The ammonium sulfate solution from which the crystalline ammonium sulfate product is recovered is typically recycled back to the feed solution of ammonium sulfate.

The terms first and second as denoted herein are used to identify two different size classification operations, and the feed and fractions resulting from those classifications. For the avoidance of doubt, unless otherwise stated, the first size classification does not necessarily occur before the second size classification in the present process.

The second slurry of ammonium sulfate comprises ammonium sulfate crystals originally formed in the crystallizer, and ammonium sulphate solution originating from the feed solution of ammonium sulfate. Preferably, the second slurry of ammonium sulfate comprises ammonium sulfate crystals which are exclusively originally formed in the crystallizer, and ammonium sulphate solution exclusively originating from the feed solution of ammonium sulfate.

The process of the present invention may be a batch or semi-batch process. However, it is typically a continuous process.

In one embodiment of the present invention the second slurry of ammonium sulfate crystals is the first fine ammonium sulfate crystal fraction. In other words the first size classification is carried out; the first coarse ammonium sulfate crystal fraction is passed to the recovery unit for the product to be recovered; the first fine ammonium sulfate crystal fraction is passed to the second size classification step, from which a second fine ammonium sulfate crystal fraction and a second coarse ammonium sulfate crystal fraction result.

In an alternative embodiment of the present invention a second slurry of ammonium sulfate crystals is withdrawn directly from the crystallizer. In this embodiment the first and second size classification steps are not directly linked; they operate in parallel. When the crystallizer is a fluidized bed reactor, the second slurry of ammonium sulfate crystals is withdrawn from the side of the crystallizer. The slurry of ammonium sulfate crystals in such a crystallizer has a gradient of crystal size: average crystal size increases from top to bottom. The crystal density in the crystallizer can be controlled such that the average crystal size of the second slurry of ammonium sulfate crystals (withdrawn from the crystallizer) is selected. Accordingly, preferably the threshold crystal size of the second size classification, is determined by adjusting the density of the first slurry of ammonium sulfate crystals in the crystallizer. Further, in one embodiment, the height of the withdrawal of the second slurry of ammonium sulfate crystals from the crystallizer can be mechanically adjusted to select the threshold average crystal size.

Typically, in the process of the present invention, at least part of the first fine ammonium sulfate crystal fraction is recycled to the feed solution of ammonium sulfate. Recycling can be direct, or it can be indirect. For example, the first fine ammonium sulfate crystal fraction can be processed further by, for example, a second size classification, before being fed to the feed solution of ammonium sulfate.

Typically, at least some of the crystals in the at least part of the first fine ammonium sulfate crystal fraction to be recycled are dissolved before the at least part of the first fine ammonium sulfate crystal fraction is recycled to the feed solution of ammonium sulfate.

Typically, at least part of the second fine crystal fraction is recycled to the feed solution of ammonium sulfate.

Typically, at least some of the crystals in the at least part of the second fine ammonium sulfate crystal fraction to be recycled are dissolved before the at least part of the second fine ammonium sulfate crystal fraction is recycled to the feed solution of ammonium sulfate. Typically, the majority of crystals are dissolved. Preferably, substantially all crystals are dissolved. This has the effect of dissolving the finest crystals in circulation in the system. Accordingly, the average crystal size of crystals remaining in the system is increased. In particular, the average crystal size of the fraction of seed crystals fed back to the feed solution is increased.

Crystals in a slurry may be dissolved by any conventional technique. This includes adding solvent to a slurry of crystals or heating a slurry of crystals. Typically, crystals are dissolved by addition of a solvent to the slurry. Preferably, the solvent is water or a dilute solution of ammonium sulfate.

As used herein average crystal size means $D_{50}$, also known as mass-median-diameter. This is known to the skilled person. It may be measured by standard techniques.

Typically, the first slurry of ammonium sulfate crystals comprises 0.1 to 50 vol. % ammonium sulfate crystals relative to the volume of the slurry. Preferably, the slurry comprises from 0.5 to 40 vol. % ammonium sulfate crystals, more preferably from 2.0 to 30 vol. % ammonium sulfate crystals.

A size classifier has a size threshold at which the ammonium sulfate slurries are separated based on the size of the ammonium sulfate crystals therein. Typically, the first size classification has a threshold of from 0.5 to 2.0 mm. Preferably, the threshold is from 1.0 to 1.6 mm. More preferably, the threshold is from 1.2 to 1.6 mm; yet more preferably from 1.3, to 1.5 mm; most preferably about 1.4 mm.

Typically, the second size classification has a threshold size smaller than that that of the first size classification. Preferably, the second size classification has a threshold smaller than the threshold of the first size classification, and is from 0.1 to 1.0 mm. More preferably, the second size classification has a threshold of from 0.3 to 0.8 mm; most preferably it has a threshold of approximately 0.6 mm.

Typically, the first size classification utilizes a filter, or a hydrocyclone. In a preferred embodiment, the size classifier is a filter having a size classifying screen. In the case where the size classifier is a filter having a size classifying screen, preferably both sides of the screen are immersed in liquid.

One embodiment of the present invention is an ammonium sulfate crystallization plant as described above. This may be a part of a chemical plant for carrying out other chemical processes, or a stand-alone plant. Typically, the plant is suitable for carrying out the processes of the present invention. The ammonium sulfate crystallization plant of the present invention typically comprises two size classifiers which each have a different threshold size.

Typically, the ammonium sulfate plant comprises: a mixing unit with an output connected to the input of a crystallizer; the crystallizer having an output connected to the input of a first size classification unit; the first size classification unit having a first output connected to the input of a second size classification unit and a second output connected to the input of a separation unit; the separation unit having a first output for product and a second output connected to an input of the mixing unit; the second size classification unit having a first output connected to an input of the mixing unit and a second output connected to the input of a dissolution unit; and the dissolution unit having an output connected to an input to the mixing unit. Preferably the arrangement of equipment is as described with respect to FIG. 3.

Alternatively the ammonium sulfate plant comprises: a mixing unit with an output connected to a crystallizer; the crystallizer having a first output connected to the input of a first size classification unit and a second output connected to an input of a dissolution unit; the first size classification unit having a first output connected to the input of a separation unit and a second output connected to an input of the mixing unit; the separation unit having a first output for product and a second output connected to an input to the mixing unit; and the dissolution unit having an output connected to the input to the mixing unit. Preferably the arrangement of equipment is as described with respect to FIG. 4.

Preferably the ammonium sulfate plant comprises: a mixing unit with an output connected to the input of a crystallizer; the crystallizer having a first output connected to the input of a first size classification unit and a second output connected to an input of a first dissolution unit; the first size classification unit having a first output connected to the input of a second size classification unit and a second output connected to the input of a separation unit; the first dissolution unit having an output connected to an input to the mixing unit; the separation unit having a first output for product and a second output connected to an input to the mixing unit; the second size classification unit having a first output connected to the input of the mixing unit and a second output connected to the input of a second dissolution unit; the second dissolution unit having an output to the mixing unit. More preferably the arrangement of equipment is as described with respect to FIG. 5.

Figure 3:
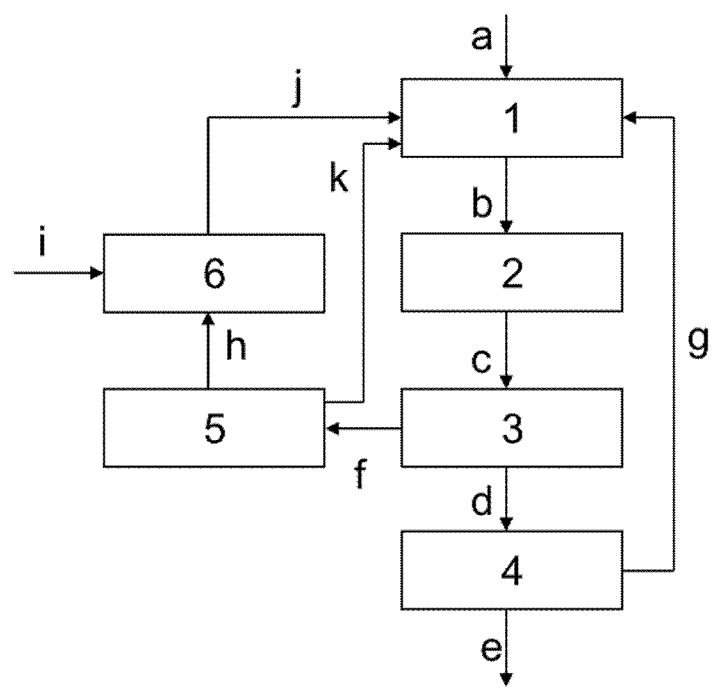
Figure 4:
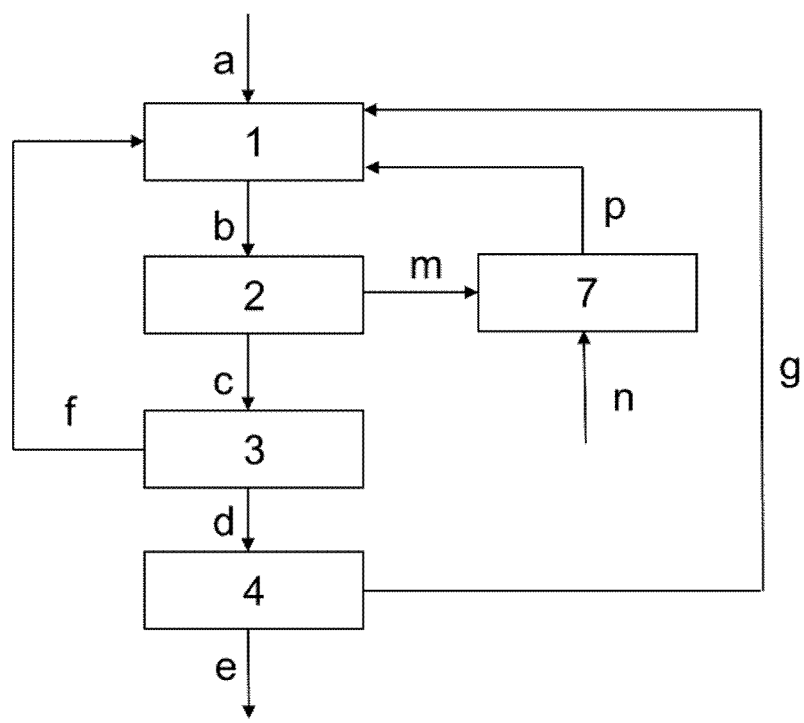
Figure 5:
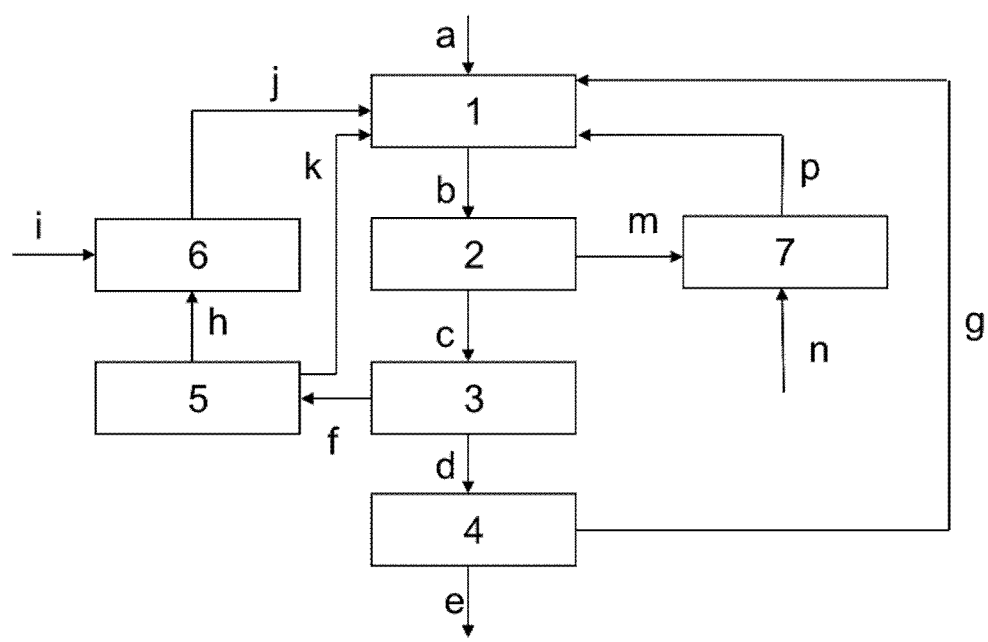

FIGS. 3, 4 and 5 each illustrate embodiments of the process of the present invention.

Figure 1:
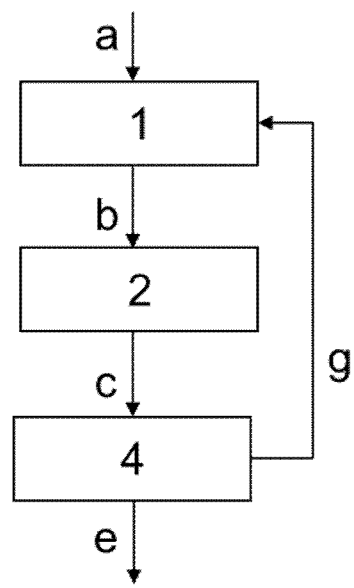
FIG. 1 illustrates the prior art, as exemplified in WO 02/081374.

FIG. 1 depicts a typical set-up according to the prior art. A fresh solution of ammonium sulfate enters, through line (a), a mixing unit (1), where it is mixed with input from line (g) to form a feed solution of ammonium sulfate. The feed solution of ammonium sulfate is then passed through line (b) into crystallizer (2), where it is subjected to crystallization, such that a slurry of ammonium sulfate crystals is produced. The slurry of ammonium sulfate crystals passes through line (c) to recovery unit (4), where crystalline ammonium sulfate is separated and removed through line (e), and ammonium sulfate solution is recycled through line (g) to mixing unit (1).

Figure 2:
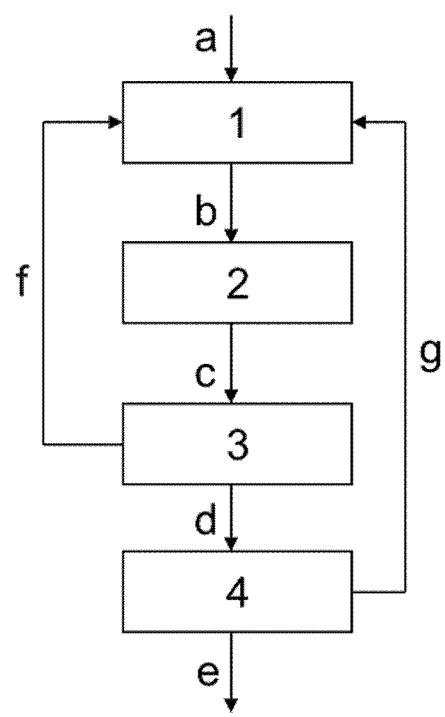
FIG. 2 illustrates an embodiment derivable form prior art processes.

FIG. 2 depicts a second embodiment of the prior art. The set-up is similar to that of FIG. 1, with the exception that a first size classifier (3) is inserted. The operation is substantially as described for FIG. 1, with the following additions. The slurry of ammonium sulfate leaving the crystallizer (2) passes via line (c) into first size classifier (3), where it is separated into a fine ammonium sulfate crystal fraction and a coarse ammonium sulfate crystal fraction. The resulting fine ammonium sulfate crystal fraction is passed via line (f) to mixing unit (1). The coarse ammonium sulfate crystal fraction is passed via line (d) to separation unit (4).

FIG. 3 depicts an embodiment of the present invention. In addition to the set-up of FIG. 2, a second size classifier (5) is added, as is a dissolution unit (6). The operation is substantially as described for FIG. 2, with the following additions. The fine ammonium sulfate crystal fraction leaving the first size classifier (3) via line (f) enters second size classifier (5), where it is separated into a second fine ammonium sulfate crystal fraction and a second coarse ammonium sulfate crystal fraction. The threshold of the second classifier (5) is smaller than that of the first size classifier (3). The second fine ammonium sulfate crystal fraction passes via line (h) into dissolution unit (6), wherein at least some of the crystals therein are dissolved by solvent, which enters via line (i). The resulting stream of ammonium sulfate is passed via line (j) to mixing unit (1). The second coarse ammonium sulfate crystal fraction is recycled via line (k) to mixing unit (1).

FIG. 4 depicts a further embodiment of the present invention. In addition to the set-up of FIG. 2, a second size classifying step is introduced. A slurry of fine ammonium sulfate crystals is removed from the upper part of the crystal bed in the crystallizer via line (m) and passed to a dissolution unit (7). Due to gravitational and drag effects, lighter (therefore smaller) crystals rise to the upper part of the crystal bed in the crystallizer. By controlling the slurry density in the crystallizer, the threshold size of the second size classifying step is controlled. A coarse ammonium sulfate crystal fraction therefore remains in the crystallizer. At least some of the removed fine ammonium sulfate crystals are dissolved in the dissolution unit (7), by solvent which enters via line (n). The resulting ammonium sulfate stream passes via line (p) into mixing unit (1).

FIG. 5 depicts a further embodiment of the present invention. It combines the set-up and operation of each of FIG. 3 and FIG. 4. In addition to the set-up of FIG. 2, a second size classifier (5) is added, as are dissolution units (6) and (7). The fine ammonium sulfate crystal fraction leaving the first size classifier (3) via line (f) enters second size classifier (5), where it is separated into a second fine ammonium sulfate crystal fraction and a second coarse ammonium sulfate crystal fraction. The threshold of the second classifier (5) is smaller than that of the first size classifier (3). The second fine ammonium sulfate crystal fraction passes via line (h) into dissolution unit (6), wherein at least some of the crystals therein are dissolved by solvent, which enters via line (i). The resulting stream of ammonium sulfate is passed via line (j) to mixing unit (1). The second coarse ammonium sulfate crystal fraction is recycled via line (k) to mixing unit (1).

Further, a fine ammonium sulfate crystal fraction is removed from the crystallizer via line (m) and passed to a dissolution unit (7). A coarse ammonium sulfate crystal fraction therefore remains in the crystallizer. At least some of the removed fine ammonium sulfate crystals are dissolved in the dissolution unit (7), by solvent which enters via line (n). The resulting ammonium sulfate stream passes via line (p) into mixing unit (1).

The present invention is illustrated by, but not limited to, the following examples.

EXAMPLES

Comparative Example 1

The set-up was substantially as shown in FIG. 1. A 300 m³ fluid bed Oslo-type crystallizer (2) was used with an external circulation circuit having a Begemann impeller pump (capacity 5000 m³·hour⁻¹) and a heat exchanger. The crystallizer was operated by evaporation at a temperature of 90° C. 180 m³ of aqueous crystal slurry was present comprising ammonium sulfate crystals in a saturated ammonium sulfate solution in water. In the lower part of the crystallizer (2) was a crystal bed (effectively a dense slurry) with an ammonium sulfate crystal concentration in the range of 40 to 50 wt. %.

Ammonium sulfate feed solution, which was obtained as a by-product in a production process for producing caprolactam, and which comprised ammonium sulfate dissolved in water (40 wt. % ammonium sulfate with respect to the solution) was introduced via line (a) into a mixing unit (1). Ammonium sulfate passed through line (b) into crystallizer (2). A slurry of ammonium sulfate crystals exited the crystallizer via line (c), through which it passed into recovery unit (4).

In mixing unit (1) fresh ammonium sulfate feed solution (delivered via line (a)) was mixed with recycled feed (delivered via line (g)) from the recovery unit (4). Typically 79 wt. % ammonium sulfate crystals discharged as product via line (e) was retained by a sieve with a sieve size of 1.4 mm. The performance of the system was translated into a model which described the system using a combined mass, heat and population balance using the Borland Delphi 5.0 programming language. The population balance describing the crystal size distribution in the system was implemented according to a first order discretization scheme similar to the description given by M. J. Hounslow, R. L. Ryall, V. R. Marshall in *A discretized population balance for nucleation, growth, and aggregation*; AIChE J., 34 (1988) 1821-1832. The description of primary crystal nucleation and crystal growth were obtained from lab-scale experiments, whereas the description of secondary crystal nucleation was calibrated on the basis of production data. The model was used to simulate the performance of the described crystallizer system, consisting of a start-up period of approximately 30 hours and a steady-state operation period of 90 hours. The performance of the crystallizer was characterized by the weight % of crystals produced during the steady-state operation retained by a sieve of 1.4 mm as compared to the total weight of crystals produced in that period. The relative weight of crystals with a crystal size above 1.4 mm is called the granular efficiency. For Comparative Example 1, a granular efficiency of 79% was calculated.

The simulation model was used to investigate the examples according to the invention by adding appropriate units to the simulation model of Comparative Example 1.

Comparative Example 2

The set-up was substantially as shown in FIG. 2. In this embodiment the simulation model developed as used in Comparative Example 1 was transformed into the equipment configuration as depicted in FIG. 2, by installing a first size classifier (3) between the crystallizer (2) and the recovery unit (4). The first size classifier (3) separated the particles according to size. The separation of the particles is described by Equation (1):

$$\frac{\text{separated crystals}}{\text{feed crystals}} = sep\ fac \cdot \exp\left[-\left(\frac{d_p}{d_{sep}}\right)^n\right] \quad \text{(Equation 1)}$$

Here, sep fac is a proportionality coefficient representing the fraction of crystals separated from the stream (expressed as a percentage), $d_p$ is the size of the crystal based on sieve analysis, $d_{sep}$ is the characteristic crystal diameter for separation and n is the separation sharpness. Both $d_{sep}$ and n are parameters of the equipment. In Comparative Example 2 different threshold sizes of the first size classifier (3) were tested in the range of from 0.3 to 1.2 mm while setting the separation sharpness (n) to a value of 20, indicating a sharp separation by the first size classifier (3).

TABLE 1

| Example no. | Threshold size of first size classifier (3) | Granular efficiency | Type of operation |
|---|---|---|---|
| Comp. Ex. 1 | Not applicable | 79.1% | Stable operation |
| Comp. Ex. 2-I | 0.3 mm | 71.2% | Stable operation |
| Comp. Ex. 2-II | 0.6 mm | 60.0% | Stable operation |
| Comp. Ex. 2-III | 0.8 mm | 52.7% | Stable operation |
| Comp. Ex. 2-IV | 1.0 mm | 44.7% | Stable operation |
| Comp. Ex. 2-V | 1.2 mm | Not applicable | Unstable operation |

Table 1 gives the results of Comparative Example 1 together with the results for different threshold sizes of the first size classifier (3) of Comparative Example 2. The granular efficiency dropped immediately when fines were returned to the crystallizer. The granular efficiency gradually dropped from approximately 80% to 45% as the threshold size of the first size classifier was increased from zero (no first size classifier as in Comparative Example 1) to 1 mm. When a threshold size of 1.2 mm was used an unstable operation of the system was seen because the system contained too large a quantity of small crystals.

Comparative Example 3

The set-up was substantially as shown in FIG. 2, but with a dissolution unit inserted into line (f) (as described in relation to FIG. 3). To this dissolution unit water is added. In this embodiment, the simulation model developed as used in Comparative Example 1 was transformed by inserting a dissolution unit with a water feed into line (f). The fine ammonium sulfate crystal fraction from first size classifier (3) passed via line (f) into the dissolution unit, where the crystals therein were dissolved by addition of water. The resulting stream was returned to mixing unit (1). Different threshold sizes for the first size classifier (3) were tested in the range of from 0.3 to 1.4 mm, while setting the separation sharpness to a value of 20, indicating a sharp separation by the first size classifier.

TABLE 2

| Example no. | Threshold size of first size classifier (3) | Granular efficiency | Type of operation |
|---|---|---|---|
| Comp. Ex. 1 | Not applicable | 79.1% | Stable operation |
| Comp. Ex. 3-I | 0.3 mm | 79.1% | Stable operation |
| Comp. Ex. 3-II | 0.6 mm | 80.1% | Stable operation |
| Comp. Ex. 3-III | 1.0 mm | 84.4% | Stable operation |
| Comp. Ex. 3-IV | 1.2 mm | 80.4% | Borderline stability |
| Comp. Ex. 3-V | 1.4 mm | Not applicable | Unstable operation |

Table 2 gives the results of Comparative Example 1 together with the results for different threshold sizes of the first size classifier (3) of Comparative Example 3. When a small threshold size was used (0.3 mm) no significant increase in granular efficiency was seen. This is because the crystallizer contained a limited amount of fines. However, an increase in granular efficiency was seen as the threshold size was increased up to 1.0 mm. Increasing the threshold size to a value of 1.2 mm decreased the granular efficiency again. This is because the system tended to become unstable, with a large variation in granular efficiency. The situation became worse when the threshold size was set to 1.4 mm, resulting in an unstable system that was not controllable and therefore would not result in a steady-state operation.

Example 1

The set-up was substantially as shown in FIG. 3. In this embodiment according to the present invention, the simulation model developed as used in Comparative Example 1 was transformed into the equipment configuration as depicted in FIG. 3 by installing a first size classifier (3) between the crystallizer (2) and the recovery unit (4); a second size classifier (5) and a dissolution unit (6), connected by line (h), in line (f); a line (k) which returned a second coarse ammonium sulfate fraction back to mixing unit (1); and a line (i) through which water was fed to the dissolution unit (6). The resulting stream of ammonium sulfate is passed via line (j) to mixing unit (1). This is as described above in relation to FIG. 3.

The threshold size of the first size classifier (3), was tested within a range of from 1.4 to 1.6 mm. The second size classifier (5) was maintained at 0.6 mm. The separation sharpness of both classification units were set to a value of 20, indicating a sharp separation by the classification unit. The separation factor (Equation 1) has been varied at values of 0%, 50% and 100%. Separation factor is the proportion of slurry subjected to size classification. A separation factor of 50%, indicates that half of the slurry is subjected to the size classification; the other half bypasses the size classifier. A separation factor of 0% means that there is no size classification.

TABLE 3

| Example no. | Threshold size of first/second size classifier | Separation factor first/second size classifier | Granular efficiency |
| --- | --- | --- | --- |
| Comp. Ex. 1 | Not applicable | Not applicable | 79.1% |
| Ex. 1-I | 1.4 mm/0.6 mm | 50%/0% | 75.9% |
| Ex. 1-II | 1.4 mm/0.6 mm | 50%/100% | 83.4% |
| Ex. 1-III | 1.4 mm/0.6 mm | 100%/100% | 89.5% |
| Ex. 1-IV | 1.6 mm/0.6 mm | 100%/100% | 94.9% |

Table 3 gives the results of Comparative Example 1 together with the results for different threshold sizes of the first size classifier (3) tested in Example 1. Ex. 1-I effectively used the same system as that of Comp. Ex. 3-V, with the difference that the separation factor of the first size classifier (3) was set to 50%, rather than 100%. This stabilized the operation of the crystallizer, but the resulting granular efficiency of the system was lower than in Comparative Example 1 (75.9% rather than 79.1%). In general the granular efficiency was shown to increase by increasing the separation factor of the second size classifier. From Ex 1-I to Ex1-II, the granular efficiency increased from 75.9 to 83.4%, corresponding to an increase in separation factor of the second size classifier of from 0 to 100%. This increase in granular efficiency of 7.% demonstrates the effect of introducing a second size classification. A further increase of the granular efficiency from 83.4 to 89.% was shown by increasing the separation factor of the first size classifier from 50% to 100% (Ex 1-II to Ex 1-III). An increase of the granular efficiency to 94.9% was shown to be possible by increasing the threshold of the first size classifier from 1.4 to 1.6 mm. This demonstrates that optimizing size classification threshold size significantly increases the granular efficiency. Overall an increase in granular efficiency of 15.8% is demonstrated.

Example 2

The set-up was substantially as shown in FIG. 4, but with a dissolution unit inserted into line (f) (as described in relation to FIG. 3). In this embodiment according to the invention double classification was achieved by applying a special feature of the Oslo-type crystallizer, namely internal size classification. Internal size classification takes place in the upper part of the fluid bed where the average crystal size has the lowest value. A fraction of the slurry was removed from the upper part of the fluid bed by drawing off 15 m$^3$ hour$^{-1}$ of ammonium sulfate slurry at a liquid velocity of 21 and 42 mm·s$^{-1}$. Thereby the second fine ammonium sulfate crystal fraction was formed; the second coarse ammonium sulfate crystal fraction being the slurry remaining in the crystallizer. The first size classifier had a threshold of 1.6 mm and a separation sharpness of 20.

TABLE 4

| Example no. | Liquid velocity | Granular efficiency |
| --- | --- | --- |
| Comp. Ex. 1 | Not applicable | 79.1% |
| Ex. 2-I | 21 mm · s$^{-1}$ | 91.1% |
| Ex. 2-II | 42 mm · s$^{-1}$ | 91.3% |

Table 4 gives the results of Comparative Example 1 together with the results of the two experiments of Example 2. Granular efficiency increased from 79.1% to 91.1%, by introducing a second size classifier with a liquid velocity of withdrawal of 21 mm·s$^{-1}$. This shows that an increase in granular efficiency can be achieved by a second size classification, even when that is not directly linked to the first size classification. Doubling the liquid velocity of withdrawal from 21 to 42 mm·s$^{-1}$ (Ex. 2-II) only increased the granular efficiency from 91.1 to 91.3%.

The invention claimed is:

1. A process for preparing a crystalline ammonium sulfate product, which process comprises:
   a) subjecting a feed solution of ammonium sulfate to crystallization in a crystallizer to form a first slurry of ammonium sulfate crystals;
   b) subjecting the first slurry of ammonium sulfate crystals to a first size classification to yield a first coarse ammonium sulfate crystal fraction and a first fine ammonium sulfate crystal fraction;
   c) recycling at least part of the first fine ammonium sulfate crystal fraction to the feed solution of ammonium sulfate;
   d) recovering a crystalline ammonium sulfate product from the first coarse ammonium sulfate crystal fraction, and
   e) subjecting a second slurry of ammonium sulfate crystals to a second size classification to yield a second coarse ammonium sulfate crystal fraction and a second fine ammonium sulfate crystal fraction, wherein (i) the second slurry of ammonium sulfate crystals is the first fine ammonium sulfate crystal fraction or (ii) the second slurry of ammonium sulfate crystals is withdrawn directly from the crystallizer.

2. The process according to claim 1, wherein option (ii) of step e) comprises determining a threshold crystal size of the second size classification by adjusting density of the first slurry of ammonium sulfate crystals in the crystallizer.

3. The process according to claim 1, which further comprises recycling at least part of the first fine ammonium sulfate crystal fraction to the feed solution of ammonium sulfate.

4. The process according to claim 3, which comprises dissolving at least some of the crystals in the at least part of the first fine ammonium sulfate crystal fraction to be recycled before the at least part of the first fine ammonium sulfate crystal fraction is recycled to the feed solution of ammonium sulfate.

5. The process according to claim 1, which comprises recycling at least part of the second fine crystal fraction to the feed solution of ammonium sulfate.

6. The process according to claim 1, which comprises dissolving at least some of the crystals in the at least part of the second fine ammonium sulfate crystal fraction to be recycled before the at least part of the second fine ammonium sulfate crystal fraction is recycled to the feed solution of ammonium sulfate.

7. The process according to claim 1, wherein the first slurry of ammonium sulfate crystals comprises 0.1 to 50 vol. % ammonium sulfate crystals relative to the volume of the slurry.

8. The process according to claim 1, wherein the first size classification has a threshold of from 0.5 to 2.0 mm.

9. The process according to claim 1, wherein the second size classification has a threshold smaller than the threshold of the first size classification and is from 0.1 to 1.0 mm.

10. The process according to claim 1, wherein the first size classification utilizes a filter or a hydrocyclone.

* * * * *